(12) United States Patent
Moretti et al.

(10) Patent No.: US 7,341,282 B2
(45) Date of Patent: Mar. 11, 2008

(54) DETACHABLE PLUG COUPLING PROVIDED WITH AN ADDITIONAL LOCKING ELEMENT

(75) Inventors: Erminio Moretti, Grenoble (FR); Daniel Martin-Cocher, Grenoble (FR)

(73) Assignee: A. Raymond & CIE, Grenoble (FR)

(*) Notice: Subject to any disclaimer, the term of this patent is extended or adjusted under 35 U.S.C. 154(b) by 644 days.

(21) Appl. No.: 10/472,839

(22) PCT Filed: Mar. 20, 2002

(86) PCT No.: PCT/EP02/03076

§ 371 (c)(1),
(2), (4) Date: Apr. 14, 2004

(87) PCT Pub. No.: WO02/079684

PCT Pub. Date: Oct. 10, 2002

(65) Prior Publication Data

US 2007/0040377 A1    Feb. 22, 2007

(51) Int. Cl.
*F16L 35/00*    (2006.01)
*F16L 39/00*    (2006.01)

(52) U.S. Cl. ............... 285/82; 285/93; 285/23; 285/313; 285/319

(58) Field of Classification Search ............ 285/23, 285/93, 921, 82, 83, 84, 85, 86, 308, 307, 285/313, 319
See application file for complete search history.

(56) References Cited

U.S. PATENT DOCUMENTS

| | | | |
|---|---|---|---|
| 4,869,534 A | 9/1989 | Ketcham et al. | |
| 5,069,424 A * | 12/1991 | Dennany et al. | 251/149.6 |
| 5,374,088 A * | 12/1994 | Moretti et al. | 285/305 |
| 5,628,531 A * | 5/1997 | Rosenberg et al. | 285/81 |
| 6,082,779 A | 7/2000 | Lesser et al. | |
| 6,089,616 A * | 7/2000 | Trede et al. | 285/93 |
| 6,536,807 B1* | 3/2003 | Raymond et al. | 285/93 |
| 2006/0151999 A1* | 7/2006 | Poder et al. | 285/305 |

FOREIGN PATENT DOCUMENTS

DE    19822574    10/1999

* cited by examiner

*Primary Examiner*—Daniel P. Stodola
*Assistant Examiner*—Jay R Ripley
(74) *Attorney, Agent, or Firm*—Gifford, Krass, Sprinkle, Anderson & Citkowski, P.C.

(57) ABSTRACT

The detachable plug coupling operative to connect fluid lines, particularly fuel lines of motor vehicles. The plug coupling includes a tubular insertion part with an encircling retaining rib and a coupling housing having a cylindrical accommodating space for the insertion part. The plug coupling also has an enlarged head part with a separate retaining element, having elastically opening retaining edges. The retaining edges are radially directed into the accommodating space and engage behind the retaining rib after the insertion part has been pushed in. In order to ensure that the retaining rib is correctly snapped in behind the retaining edges after the insertion part has been inserted, an additional locking element is provided, which is guided in a transversally displaceable manner on the housing head between an opening position and a closing position.

3 Claims, 2 Drawing Sheets

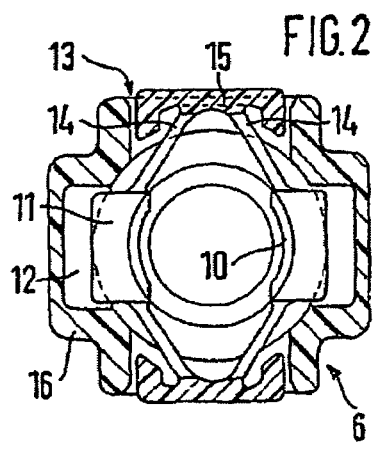
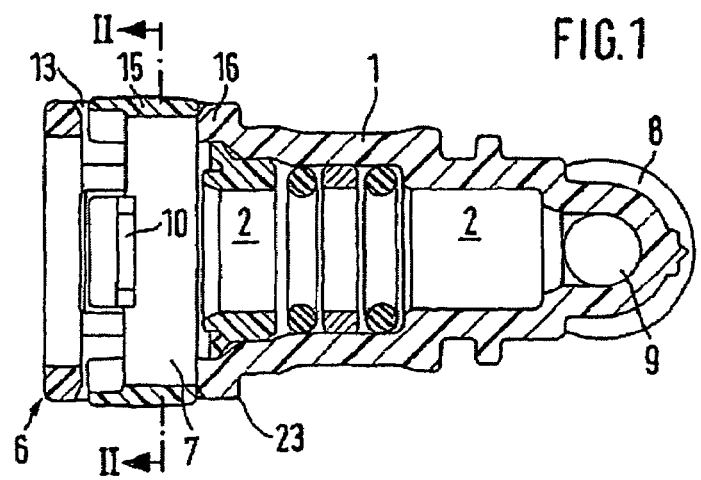
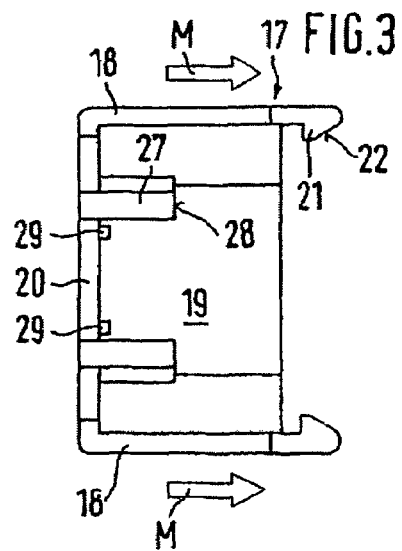
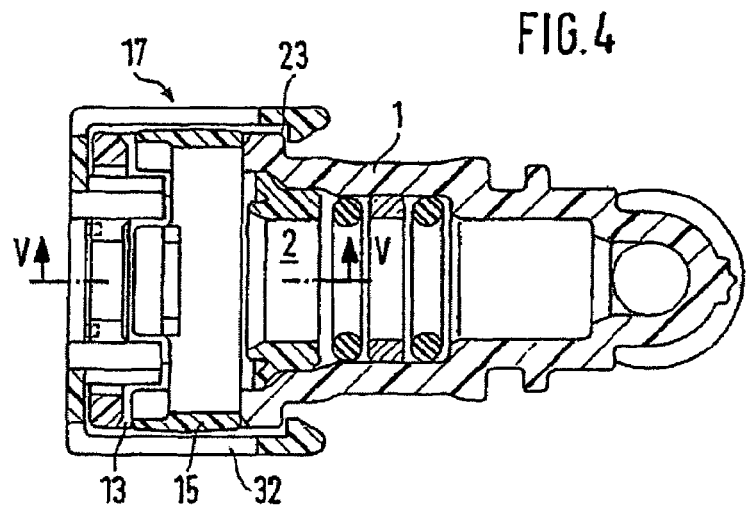
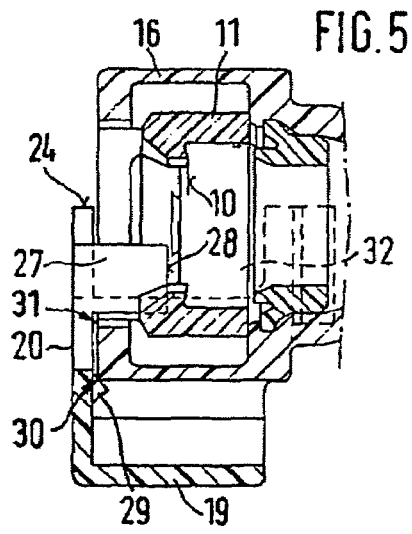
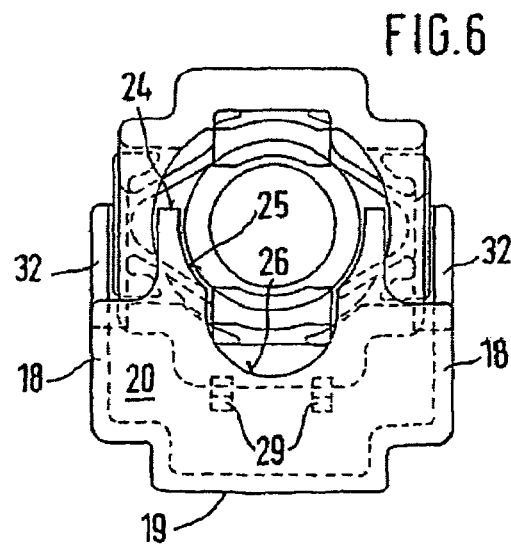

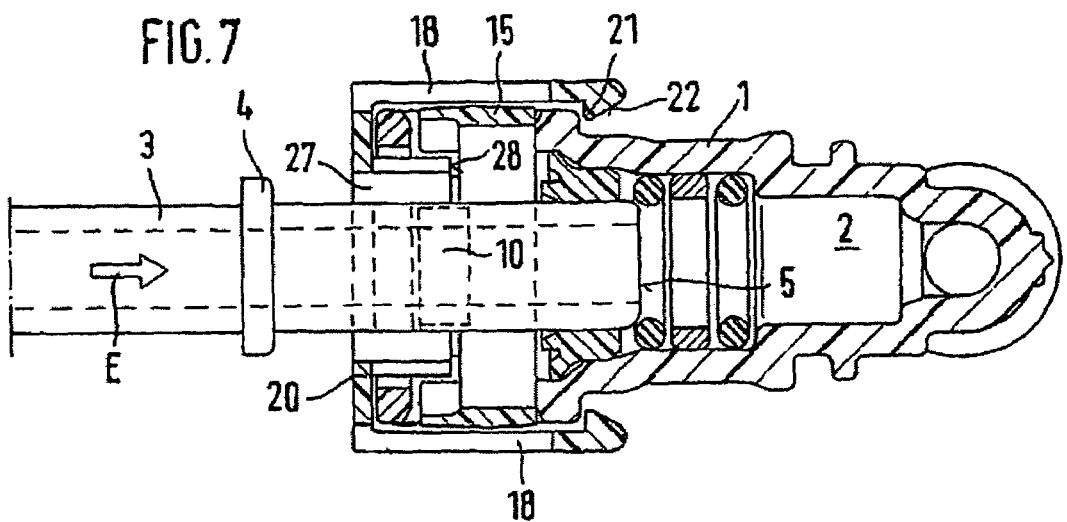
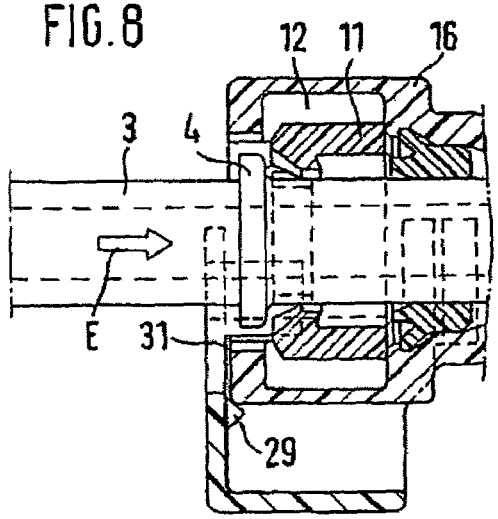
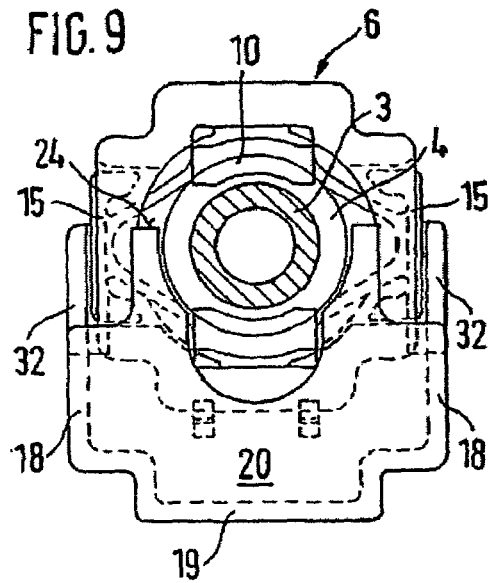
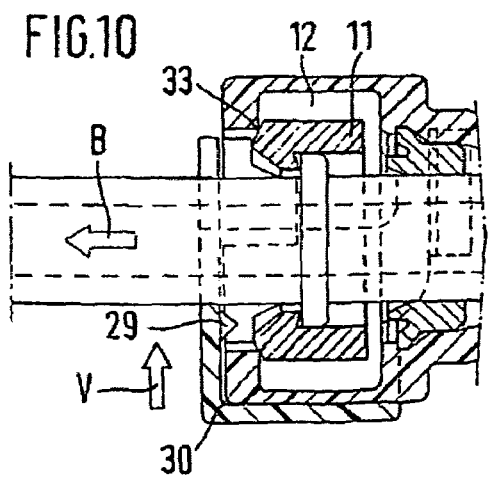
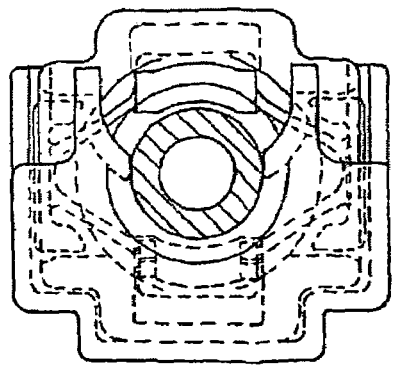

DETACHABLE PLUG COUPLING PROVIDED WITH AN ADDITIONAL LOCKING ELEMENT

RELATED APPLICATIONS

This application is the U.S. national phase of International Application No. PCT/EP02/03076 filed 20 Mar. 2002, which claims priority of German Application No. 101 15 399.6 filed 29 Mar. 2001.

FIELD OF THE INVENTION

The invention relates to a detachable plug coupling with an additional locking element for the connection of fluid lines. Such plug couplings are used in the construction of motor vehicles to connect fuel lines to each other or to a fuel reservoir or distributor.

BACKGROUND OF THE INVENTION

Such a plug coupling with an additional locking element is known, for example, from WO 96/34224. The locking element is here designed as a catch which is attached in a manner so it can be pivoted via a hinge which is formed on the external surface of the coupling housing. A locking tongue is formed on the catch which, during engagement by pivoting of the catch after the engagement of the insertion part, is arranged between a slit trap which reaches into the housing, and the retaining rib in order to prevent the insertion part from being pulled out of the accommodating space of the coupling housing.

This locking element, in its constructive design, is unsatisfactory because it requires, for its attachment and to achieve the desired locking effect to the coupling housing, various constructive changes and adaptations. In addition, the manufacture of the hinge connection also requires an additional work step that increases the manufacturing cost of the entire plug coupling. Finally, it is considered a drawback that the catch prior to the pivoting projects transversely upward and thus occupies a large amount of space in the open position.

The object of the invention is to design the above described locking element for use with the existing plug coupling housing in such a manner that the modification of the plug coupling to add the locking element is possible with minimal constructive effort and without any changes to the coupling housing and so that the handling properties of the additionally applied locking element in the delivered state are not negatively affected.

This objective is substantially solved by the present invention which can be pressed without problem onto the head of the coupling housing in the axial direction and easily shifted into the locking position after the establishment of the coupling connection with the insertion part. In this process, it is ensured by means of the positioning humps on the internal side of the front wall that the locking element is secured both in its opening position and in its locking position. Additionally, the locking element can be used for retrofitting existing coupling housings without a great effort, even if the coupling housings are already in use.

SUMMARY OF THE INVENTION

The plug coupling of the present invention includes of a tubular insertion part having a circumferential retaining rib which can be connected to the end of one fuel line and a coupling housing is provided for connecting to the end of the other fuel line. The housing is formed with a cylindrical accommodating space and an enlarged housing head with a separate retention element. The retention element is provided with elastically opening retaining edges which are oriented radially into the accommodating space. The retaining edges engage behind the retaining rib after the insertion of the insertion part into the accommodating space. The plug coupling also includes a locking element which can be connected to the head of the coupling housing. The locking element is operative to be moved transversely to the insertion direction in front of the retaining rib after the correct engagement of the insertion part in the retention element.

BRIEF DESCRIPTION OF THE DRAWINGS

In the drawings, an embodiment of the invention is represented, which will be further explained below. In the drawings:

FIG. 1 shows the coupling housing in a longitudinal cross section without locking element, FIG. 2 shows a cross section through the head of the coupling housing along the line II-II in FIG. 1, FIG. 3 shows a locking element in plan view, FIG. 4 shows the coupling housing in a longitudinal cross section as in FIG. 1 with the locking element pressed onto the housing head, FIG. 5 shows a partial cross section, rotated by 90°, through the housing head along line V-V in FIG. 4 with locking element in the opening position, FIG. 6 shows the housing head with locking element in front view, FIG. 7 shows a longitudinal cross section through the coupling housing as in FIG. 4 during the insertion of an insertion part, FIG. 8 shows a partial cross section, rotated by 90°, through the housing head as in FIG. 5 during the continued insertion of the insertion part with locking element in the opening position, FIG. 9 shows the associated front view, FIG. 10 shows a partial cross section as in FIG. 8 with completely engaged insertion part and transversely shifted locking element in the closing position, and FIG. 11 shows the associated front view.

DETAILED DESCRIPTION OF THE INVENTION

The plug coupling represented in the figures is substantially comprised of a coupling housing 1 with a cylindrical accommodating space 2 for the insertion of a tubular insertion part 3 at a spaced distance from the opening end 5, wherein the tubular insertion part 3 includes a circumferential retention rib 4 (see also FIG. 7). The coupling housing 1 is formed with an enlarged housing head 6, which receives a separate retention element 7. The end of the accommodating space 2 is connected to the coupling housing 1 by means of a connecting adapter 8 having an outlet opening 9 through which the fluid conveyed through the coupling can continue to flow into a fluid line which is not shown.

The holding element 7 is provided with retaining edges 10 that can be elastically opened and are oriented radially into the accommodating space 2. The retaining edges are pressed away from one another by the retaining rib 4 during the pressing of the insertion part 3 into the accommodating space 2 in the direction of the arrow "E". The retaining edges 10 spring back into their starting position after the insertion to engage behind the retaining rib 4 in a known manner to firmly couple the insertion part 3 in the coupling housing 1.

The retaining edges 10 are formed on two support bodies 11 which project outward, and which, in turn, in the installed state of the retaining element 7 are urged into corresponding recess 12 of the housing wall 16, where they are held against the direction of insertion. The support bodies 11 are interconnected at their ends by V-shaped spring bridges 14 which are connected together. The spring bridges 14 are covered with rectangular pressure plates 15 at their connection points. The pressure plates 15 extend outward through corresponding openings 13 into the housing wall 16.

To release the coupling, the pressure plates 15 are pressed together from outside. In this manner, the retaining edges 10 are moved apart over the spring bridges 14 and the support bodies 11 so that the retaining rib 4 is uncovered, and the insertion part 3 can be pulled out of the coupling housing 1.

To ensure that the retaining rib 4 correctly engages behind the retaining edges 10 after insertion, an additional locking element 17 is provided which is attached to the housing head 6. The locking element 17 is designed so that it has a rectangular cross section that allows transverse shifting. This locking element 17 includes, as is apparent from FIGS. 3, 5 and 6, of two lateral walls 18 that surround the housing head 6 on both sides. A U-shaped transverse wall 19 holds the lateral walls 18 and the locking element 17 which is connected on one side with a front plate 20 to form one piece. On the other side of the lateral walls 18, inward pointing stop edges 21 are formed with outward extending insertion surfaces 22. When the lateral walls 18 are pressed onto the housing head 6 in the direction of the arrows "M," the insertion surfaces 22 broaden in the manner of a spring. The inward pointing stop edges 21 engage with the head edges 23 behind the pressure plates 15 when the front plate 20 is applied against the front side of the housing head 6. In this manner, the locking element 17 is led on the housing head 6 such that it can be shifted transversely.

In this process, the front plate 20 presents a semicircular recess 25 whose diameter is slightly larger than the external diameter of the retaining rib 4. The recess 25 starts from the free closing edge 24 of the front plate, in the middle between the side walls 18. In addition, because of the recess 25, an additional semicircular recess 26 is formed in the front plate 20 that has a diameter adapted to the tube diameter of the insertion part 3. Arc-shaped bars 27 are formed on both sides of the front plate 20 at the larger recess 25. The arc-shaped bars 27 extend into the opening of the housing head 6, where the support surfaces 28 of the support bars end in the loaded state shown in FIG. 10 with the engagement plane of the retaining edges 10.

To use the locking element 17, the lateral walls 18 with the stop edges 21 are first pressed onto the housing head 6 in the axial direction in a manner that the insertion surfaces 22 slide over the pressure plates 15. Thereafter, the stop edges 21 engage with the back head edges 23, and the support bars 27 penetrate into the free space between the spring bridges 14 of the retaining element 7.

The locking element 17 is first brought into the opening position shown in FIG. 5 and 6, where the middle point of the larger semicircular recess 25 is precisely aligned with the axis of the accommodating space 2. In this position, the insertion part 3, as shown in FIGS. 8 and 9, can be introduced into the coupling housing 1 where the retaining rib 4 passes by with little clearance at the arc-shaped support bars 27. As soon as the retaining rib 4 has passed the retaining edges 10 of the retaining element 7, and the retaining edges 10 are again returned by spring action into their rest position, the locking element 17 can be shifted in the direction of the arrow "V" toward the middle until the smaller semicircular recess 26 is applied against the tubular wall of the insertion part 3. The support bars 27 are consequently shifted with their support surfaces 28 behind the retaining rib 4 to provide an additional retention force in the coupling housing 1 against a load on the insertion part 4 in the direction of the arrow "B," through the contact of the support body 11 to the internal edge 33 of the recess 12.

To be able to fix the locking element 17 both in the opening position and in the closing position, slanted positioning humps 29 are formed on both sides of the inside of the front plate 20. The latter are applied in such a manner that, in the opening position (see also FIGS. 5 and 8), they are located in front of the external edge 30 of the housing 6 and, after shifting into the closing position (see also FIG. 10), they engage with the external edge 31 of the housing opening.

Moreover, recesses 32 formed on the lateral walls 18 have dimensions such that, after shifting into the closed position, cover the pressure plates 15 at least partially. After shifting into the open position, the recesses 32 uncover the pressure plates 15 so that the retaining edges 10 can only be pressed apart after the locking element 17 has been pushed back over the pressure plates 15 to release the insertion part 3. The locking element 17 thus offers the double locking function and an optical display for the correct engagement due to the pressure plate 15 being largely covered after the locking action.

The invention claimed is:

1. A detachable plug coupling with a locking element for the connection of liquid lines comprising:
   a coupling housing with an accommodating space adapted for insertion of a tubular insertion part having a circumferential retaining rib;
   an enlarged housing head formed on the coupling housing for receiving a retaining element; wherein the retaining element includes elastically opening retaining edges oriented radially into the accommodating space, and said retaining edges are operative to engage behind the retaining rib after the insertion of the insertion part into the accommodating space;
   a transversely displaceable locking element secured to the housing head, wherein the locking element includes two lateral walls positioned adjacent the housing head, a U-shaped transverse wall disposed between the two lateral walls, a front plate connected to an uppermost edge of each of the two lateral walls and the transverse wall; and
   inwardly pointing stop edges located on a lowermost edge of each of the two lateral walls that operatively engage a head edge of the coupling housing after transverse movement of the locking element between an open position and a closed position;
   wherein the front plate, when in an open position, includes a first semicircular recess adapted to correspond to an external diameter of the retaining rib and a second semicircular recess adapted to correspond to a diameter of the tubular insertion part, and the second semicircular recess extends from a base of the first semicircular recess towards the transverse wall; and
   an arc-shaped support bar formed on the front plate, adjacent an outer edge of the first semicircular recess, before the transition to the second semicircular recess and extending into the accommodating space; wherein the support bar includes a support surface that ends with an engagement plane of the retaining edges when the locking element is in the closed position, and the locking element is adapted to be connected to the housing head, and is operatively displaced transversely in an insertion direction to retain the retaining rib, after engagement of the tubular insertion part in the retaining element.

2. The detachable plug coupling of claim 1 wherein the retaining edges of the retaining element are formed on supporting bodies that are received within a corresponding recess in a housing wall, and the support bodies are interconnected by at least one V-shape spring bridge, and the closed edge of each V-shaped bridge is connected to a pressure plate that projects outwardly through a corresponding opening in the housing wall, and the at least one pressure plate is operatively pressed inwardly to detach the tubular insertion part, and each lateral wall of the locking element includes a recess for operatively releasing the at least one pressure plate when the locking element is in the open position and that only partially exposes the at least one pressure plate when the locking element is in the closed position.

3. A detachable plug coupling with a locking element for the connection of liquid lines comprising:

a coupling housing with an accommodating space adapted for insertion of a tubular insertion part having a circumferential retaining rib;

an enlarged housing head formed on the coupling housing for receiving a retaining element, wherein the retaining element includes elastically opening retaining edges oriented radially into the accommodating space, and said retaining edges are operative to engage behind the retaining rib after the insertion of the insertion part into the accommodating space;

a transversely displaceable locking element secured to the housing head, wherein the locking element includes two lateral walls positioned adjacent the housing head, a U-shaped transverse wall disposed between the two lateral walls, a front plate connected to an uppermost edge of each of the two lateral walls and the transverse wall, and inwardly pointing stop edges located on a lowermost edge of each of the two lateral walls that operatively engage a head edge of the coupling housing, after transverse movement of the locking element between an open position and a closed position;

wherein the front plate, when in an open position, includes a first semicircular recess adapted to correspond to an external diameter of the retaining rib and a second semicircular recess adapted to correspond to a diameter of the tubular insertion part, and the second semicircular recess extends from a base of the first semicircular recess towards the transverse wall;

an arc-shaped support bar formed on the front plate, adjacent an outer edge of the first semicircular recess, before the transition to the second semicircular recess and extending into the accommodating space, wherein the support bar includes a support surface that ends with an engagement plane of the retaining edges in the closed position, and the locking element is adapted to be connected to the housing head, and the locking element is operatively displaced transversely in an insertion direction to retain the retaining rib, after engagement of the tubular insertion part in the retaining element; and a slanted position hump formed on an inside surface of the front plate, such that in the open position of the locking element, the slanted position hump is located adjacent an external edge of the housing head, and elastically deforms the front plate to allow the locking element to slide transversely over the housing head and in the closed position of the locking element engages on an internal edge of an opening in the accommodation space of the housing, the opening in the accommodation space for the insertion of the tubular insertion part.

* * * * *